June 14, 1966   M. L. CRIPE   3,256,046
VEHICLE BRAKE MEANS
Filed Feb. 27, 1964
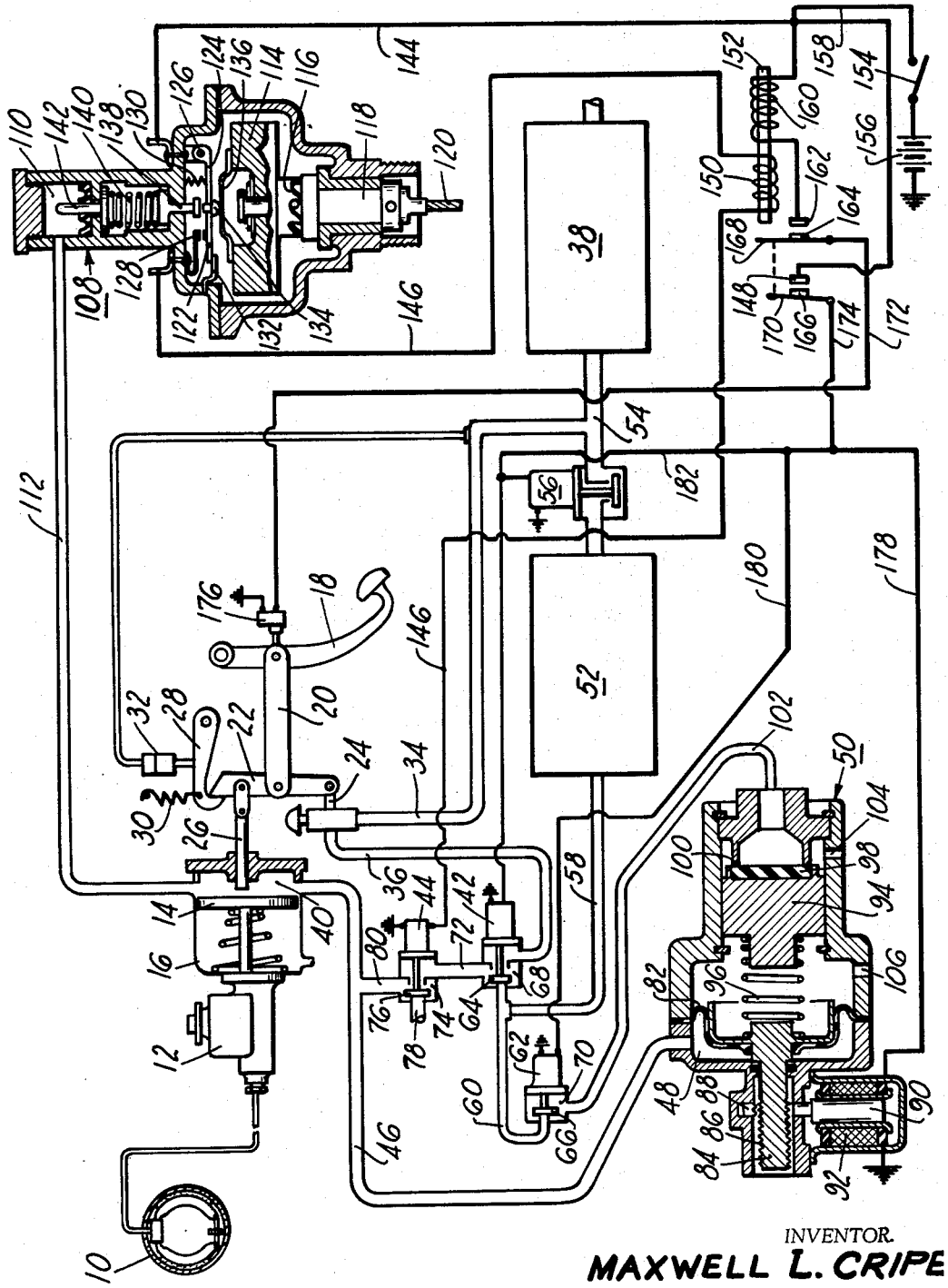
INVENTOR.
MAXWELL L. CRIPE
BY
Richard G. Geil
ATTORNEY

# United States Patent Office 3,256,046
Patented June 14, 1966

3,256,046
VEHICLE BRAKE MEANS
Maxwell L. Cripe, South Bend, Ind., assignor to The Bendix Corporation, South Bend, Ind., a corporation of Delaware
Filed Feb. 27, 1964, Ser. No. 347,759
5 Claims. (Cl. 303—21)

This invention relates to a braking means for a motor vehicle and more particularly to an anti-skid device operating in combination with the braking means on a motor vehicle.

To obtain maximum braking on a motor vehicle, it is necessary that the vehicle wheels maintain a rotating condition relative to the road. When the vehicle wheels fail to rotate and are in a slipping condition on the road surface, the braking effect of the motor vehicle is substantially reduced. Accordingly, the optimun condition in braking of a motor vehicle is to maintain a rotating condition of the vehicle wheel wherein the wheel maintains a firm grip with the road surface. It is not always possible for the operator to control the braking to maintain this condition, particularly under a panic stop during emergency conditions.

Accordingly, this invention is intended to provide an automatic reduction of a brake pressure in a brake actuating system of the vehicle when a deceleration of the vehicle wheels is sensed, which deceleration exceeds a predetermined rate.

Another object of the invention is to provide a hydraulic brake control which provides shorter, smoother stop then prior types of similar apparatus, and which does not stress the control and brake means as severely as prior types of similar apparatus.

During normal operation of skid-preventing apparatus as is available today, as long as the pressure being metered by the brake system control means exceeds that sufficient to initiate skidding of the wheel, a pulsating braking action takes place. This is the result of a cyclical removal and restoration of brake pressure in response to skidding of the wheel and subsequent acceleration thereof toward running speed, respectively. During the early portion of the brake applications such pulsations of retarding efforts are not particularly objectionable or noticeable since they normally occur at relatively small amplitude while the vehicle is still traveling at a high speed. However, as the vehicle speed progressively decreases and its weight is transferred increasingly to the wheels, the latter are capable of correspondingly greater traction on the road surface. Thus the wheel brakes become proportionally more effective to retard the vehicle. Consequently the pulsating action of the skid-preventing apparatus mentioned above becomes increasingly noticeable as the vehicle slows down and can become of such amplitude that the entire vehicle is shaken. It is thus a further object of my invention to eliminate such displeasing cyclical removal and restoration of brake pressure by providing an apparatus which establishes a brake pressure below that which will create wheel locking or skidding and thereafter apply only the established brake pressure.

I have also found that the prior art is replete with devices for reducing braking pressures in vehicle braking systems incrementally. This however, also creates undesirable pulsations and associated problems. It is, therefore, also a primary intent of my invention to provide a means for automatically and immediately reducing braking pressure to a level below that causing vehicle skid.

The present invention utilizes in a unique manner a skid sensing unit operatively connected to a power brake apparatus and to an anti-skid reservoir reducer valve means in a braking system having a primary and secondary power fluid source arranged such that the secondary source may be cut off from the primary source to lower the fluid pressure available to the power brake means.

Still further objects and advantages of my invention will become apparent to those skilled in the art from the following description of the drawing showing in schematic a brake system in accordance with the principles of my invention.

With more particular regard to the drawings I have shown a vehicle wheel brake 10 connected to a master cylinder 12 controlled by a piston 14 within a power chamber 16. The vehicle is provided with the familiar brake pedal 18 that is connected by means of a link 20 to a lever 22 connected at opposite ends to a control valve rod 24 and a piston rod 26. The lever 22 is normally held by means of a latch 28 having a spring 30 connected thereto, which spring is opposed by a fluid pressure motor 32.

In normal operation the lever 22 being held by the latch 28 will mean that upon depressing the brake pedal 18 the control valve rod 24 will be actuated to open a conduit 34 to a conduit 36 whereupon fluid pressure from a primary reservoir 38 may be supplied to a power or control chamber 40 of the servomotor 16. The reservoir 38 may be connected to a fluid pressure source, air compressor, etc. As seen, the conduit 36 connects to the power chamber 40 via two solenoid valves 42 and 44 and a manifold 46 that not only communicates with the control chamber 40, as seen, but with a reference chamber 48 of an anti-skid reservoir reducer valve 50.

In addition to the primary fluid reservoir 38 I have provided a secondary fluid reservoir 52 that is normally in fluid communication with the primary fluid reservoir by means of a conduit 54 within which a solenoid valve 56 is placed to close off such communication, when it is desirable. The secondary fluid reservoir 52 is connected by means of a conduit 58 to another conduit 60 that is communicated to the solenoid valve 42 and other solenoid valve 62 having valve poppets 64 and 66, respectively, arranged to normally prevent communication of the secondary fluid reservoir with internal chambers 68 and 70 of the valves 42 and 62.

The chamber 68 of the solenoid valve 42 is communicated by means of conduit 72 to a chamber 74 of the solenoid valve 44 wherein a valve poppet 76 is operatively arranged to communicate the chamber 74 either with the conduit 72 or an overboard dump conduit 78. In the normal position shown the chamber 74 is communicated with the conduit 72 to allow fluid communication to a conduit 80 leading from chamber 74 to the manifold 46.

The anti-skid reservoir reducer valve 50 contains a flexible movable wall 82 that is connected to a plunger 84 having a serrated surface 86 arranged to mate with a clamp 88 controlled by a plunger 90 of a solenoid 92. In addition the plunger 84 is connected to a valve poppet 94 by a spring 96, which valve poppet 94 is provided with a valve disc 98 that cooperates with a valve seat 100 to control the communication of a conduit 102 leading from the chamber 70 of solenoid valve 62 with an exhaust port 104 in the housing of the reducer valve 50. As may also be seen in the drawing the housing of the anti-skid reservoir reducer valve 50 is also provided with an opening 106 to communicate a similar fluid pressure as exists behind piston 14 between the movable wall 82 and the piston valve 94 and thereby provide the proper pressure reference in this chmaber.

The aforementioned units are arranged to be subjected to the control of a skid sensing unit 108 having a pressure responsive chamber 110 connected by means of a conduit 112 with the control chamber 40 of the servomotor 16. In addition, the skid sensing unit 108 includes an inertial means such as a flywheel 114 provided with a ratchet clutch connection 116 with a rotatable member 118 connected to a speedometer cable for the vehicle, as by the cable 120. In addition I have provided a switch contact 122 mounted on an arm 124 pivoted as at 126 to the skid sensing unit housing. I have also provided a companion switch contact 128 fixed to the housing and spaced from the contact 122 by a predetermined amount. As seen a spring 130 as interposed between the arm 124 and the housing to maintain the contacts 122 and 128 in spaced relation by forcing the arm 124 to rest against a shelf 132 affixed to the housing. The arm 124 is provided with a bearing portion 134 that rests upon an abutment 136 affixed to the uppermost surface of the flywheel 114. The abutment 134 is also provided with a projection extending through the arm 124 to mate with a plunger 138 that is connected by means of a spring 140 to a pressure responsive member 142. As seen, the plunger 138 is, in its normal position, held against the housing of the skid sensing unit 108 and, as will be further explained hereinafter, the spring 140 is compressed by the pressure responsive member 142 to vary the amount of force required to lift the plunger 138 from its resting place against the housing. The switch contacts 122 and 128 are connected, respectively, to leads 144 and 146.

As seen the switch lead 144 terminates in a switch contact 148; whereas lead 146 forms a coil 150 about a bar 152 before connecting with the solenoid 44.

The remainder of the electrical circuit may be described as including a vehicle ignition switch 154 connected to a power source 156 and, when closed to a lead 158 that forms a coil 160 about the bar 152 and terminates in a contact 162. Opposite the contacts 162 and 148 I have provided cooperating contacts 164 and 166, respectively, attached to respective arms 168 and 170 that are mechanically linked together. The arms 168 and 170 are connected to leads 172 and 174, respectively. Lead 172 terminates in a normally open switch 176 which is closed by displacement of the brake pedal 18 to connect the contact 164 with ground for purposes to be explained further hereinafter. Lead 174 is connected to leads 178, 180 and 182 with lead 178 being connected to solenoid coil 92, and lead 180 being connected to solenoid 62 and lead 182 being connected to both solenoids 56 and 42.

In operation as the operator of a vehicle depresses the brake pedal 18 the switch 176 closes to connect the contact 164 with ground as aforementioned, and as the lever 22 is held by latch 28 a control valve 25 is actuated by the control rod 24 to communicate conduits 34 and 36 which will energize the control chamber 40 and move the piston 14 to actuate the master cylinder 12 and apply the brakes 10. In the event the brakes 10 lock the wheel to suddenly stop the speedometer cable, and likewise the cable 120, the flywheel 114 will be caused to rise upon the ratchet connection 116 to close the contacts 122 and 128 which will energize the coil 150 to close the contacts 162 and 164 and via the mechanical connection the conduit contacts 148 and 166 whereupon coil 160 is also energized to hold the arm 168 until the pedal 18 once again opens switch 176 regardless of the braking of the contacts 122 and 128, as would be caused by recurring wheel rotation after brake pressure drop. The closing of the contacts 148 and 166 energizes the solenoid coil 92 to lower the clamp 88 and hold the movable wall 82 in the position to which it has moved in accordance with the control pressure in chamber 40 that was communicated to chamber 48 via conduit 46. In addition the solenoid 62 retracts the poppet 66 to open conduit 60 to conduit 102, and, simultaneously, solenoids 42 and 46 retract respective poppets 64 and 76 to communicate, respectively, conduits 58 and 72 and conduits 80 and 78. This will immediately dump the pressure in the chamber 40 via the conduit 78 whereupon the brakes 10 will be released to permit wheel rotation which will immediately lower the flywheel 114 to separate the contacts 122 and 128 thereby deenergizing solenoid 44 to allow the poppet 76 to close the dump 78 and communicate the secondary reservoir 52 via conduits 58, 72, 80 and 46 to the control chamber 40 of the servomotor 16.

It should be stated that upon the actuation of solenoid 42, solenoid 56 is also energized to close off communication of the primary power fluid reservoir 38 with the secondary power fluid reservoir 52. Simultaneously, as the poppet 66 has opened communication between conduit 60 and 102 the secondary power fluid reservoir 52 is communicated to the valve disc 98 to tend to move the piston 94 against the spring 96 whose force has been determined by the movable wall 82 that is now rigidly held by clamp 88. If the pressure in the reservoir 52 is greater than that which existed in the control chamber 40 and created the skid condition the piston 94 will be moved to open the conduit 102 to the exhaust passage 104 in the housing of the anti-skid reservoir reducer valve 50. Furthermore, as the poppet 64 has been retracted to close the communication of conduits 36 and 72 communication is established between the conduits 58 and 72 so that fluid pressure in reservoir 52 may be communicated via conduit 80 to the control chamber 40 and the anti-skid reducer valve reservoir reference chamber 48. This will apply the brakes 10, but with less pressure than that required to place the associated wheel in a skidding condition.

In addition as the control chamber 40 is communicated via conduit 112 to the pressure responsive chamber 110 of the skid sensing unit the quantity of pressure required to lock the vehicle wheels in a skidding position is referenced on the pressure responsive element 142 to increase or decrease the force of the spring 140 which would tend to create opposition to upward movement of arm 124 and associated closing of contacts 122 and 128. Therefore, my skid sensing unit references the road condition automatically in that upon icy or wet roads the pressure in the chamber 110 will be substantially less than that which would create skidding on dry roads.

Although an illustrative embodiment of the invention has been described in detail herein with reference to the accompanying drawing, it is to be understood that the invention is not to be limited to this precise embodiment and that various changes and modifications may be effected therein without departing from the scope or spirit of the invention, except as defined in the appended claims.

I claim:

1. An anti-skid brake system comprising:
   a power brake means;
   a primary fluid pressure reservoir;
   a secondary fluid pressure reservoir;
   a means to communicate said primary reservoir to said secondary reservoir and to said power brake means;
   a pressure responsive means to reference pressure supplied to said power brake means;
   an exhaust valve means operatively connected to said pressure responsive means, which valve means is connected to the fluid pressure in said secondary reservoir;
   a skid sensing means;
   control means operatively connected to said skid sensing means to reduce pressure in said power brake means and close off communication of said primary reservoir with said power brake means and said secondary fluid pressure reservoir, said control means including a device to thereafter open said secondary reservoir to said valves means;
   conduit means communicating said secondary reservoir to said power brake means; and
   means to open said conduit means simultaneously with opening said secondary reservoir to said valve means whereby fluid pressure is applied to said power brake means at a level lower than that which produces the skid.

2. An anti-skid sensing means according to claim 1 and further comprising a means to regulate said skid sensing means in accordance with control pressure in said power brake means.

3. An anti-skid sensing means according to claim 2 wherein said means regulating said skid sensing means includes:
   a pressure responsive member in said skid sensing means adapted to increase resistance to operation of said skid sensing means in proportion to an increase in control pressure in said power brake means; and
   a means to communicate control pressure from said power brake means to said pressure responsive member.

4. An anti-skid brake system comprising:
   a vehicle brake means;
   a brake actuator for said vehicle brake means including,
      a brake pedal,
      a power brake means having a piston controlled by a power chamber,
      a control valve operatively connected to said brake pedal with means to communicate a fluid pressure to actuate said power brake means, and
      a fluid pressurizing means actuated by said power brake means, which fluid pressurizing means is operatively connected to said vehicle brake means;
   a primary fluid pressure reservoir for a pressurized fluid;
   a secondary fluid pressure reservoir;
   means communicating said primary reservoir to said control valve and to said secondary reservoir, said means having arranged therein between said primary and secondary reservoirs a first solenoid valve means such that said primary reservoir is always open to said control valve with said first solenoid valve means being able to terminate communication of said primary and secondary reservoirs;
   a second solenoid valve means arranged in said means communicating fluid pressure to said power chamber from said control valve, said second solenoid being adapted to close off communication of fluid pressure to said power chamber and dump said power chamber;
   a third solenoid valve in series with said second solenoid valve in said means communicating fluid pressure to said power chamber, said third solenoid being adapted to close off communication from said control valve and open communication between said secondary fluid pressure reservoir and said power chamber via second solenoid valve;
   an anti-skid reservoir reducer valve including,
      a housing with an axially extending cavity,
      a first movable wall dividing said cavity into a front and rear variable volume chambers, said first movable wall having a serrated projection extending forwardly thereof,
      a second movable wall in said housing dividing said rear variable volume chamber into a first and second variable volume chamber,
      a hollow valve seat held to said housing in said second variable volume chamber,
      a valve poppet operatively connected to said second movable wall and arranged to cooperate with said valve seat,
      a resilient means for operatively connecting said first and second movable walls,
      a clamping means adapted to cooperate with said serrated projection of said first movable wall, and
      a solenoid for controlling said clamping means;
   a first conduit means for communicating said power chamber and said front chamber to position said first movable wall in accordance with the fluid pressure applied to said power brake means;
   a means to communicate said secondary fluid pressure reservoir to said valve seat, said means including a fourth solenoid valve means adapted to create or terminate the aforesaid communication;
      a skid sensing device including,
         an inertia means,
         a drive means for said inertia means having a ratchet mechanism that will displace said inertia means upon the sudden cessation of of said drive means,
         a first switch means operatively connected to said inertia means, which switch means is normally open and is closed by displacement of said inertia means,
         a resilient means arranged for operative connection to said switch means to oppose closing thereof,
         a pressure responsive means arranged to oppose closing of said switch means, and
         a second conduit communicating said power chamber to said pressure responsive means to vary its opposition to switch closing in accordance with fluid pressure of said power brake means;
      a dual coil electromagnet means;
   an electrical power source for said vehicle including an ignition switch and a first lead therefrom that is connected to one pole of said first switch means and to a first coil of the dual coil electromagnet means;
   a second lead from the other pole of said first switch to the second coil of said electromagnet, which second lead terminates in a connection with said second solenoid;
   a second switch means having one pole connected to said first coil of said electromagnet and a switch arm adapted to be controlled by electromagnetic force which switch arm mounts a second pole for said switch;
   a third switch operatively connected to said brake pedal such that it is held in an open condition when said brake pedal is in its released position and closed by displacement of said pedal to a grounded contact which upon closure of said second switch will energize said first coil;
   a fourth switch means having one pole connected to said first lead and a switch arm bearing a second pole connected to said first, third and fourth solenoid valve means and said solenoid to energize said first, third and fourth solenoid valve means and said solenoid upon closure of said fourth switch which is mechanically linked to said second switch whereupon said electrical circuit is initially energized by closure of said first switch and maintained regardless of said first switch condition by said third switch until said brake pedal is released.

5. An anti-skid sensing means according to claim 1 wherein said control means comprises;
   a sensing means connected to said power brake means,
   a holding relay energized by said sensing means and by said skid sensing means, so that said control means will be continuously actuated until operation of said power brake means is terminated.

No references cited.

EUGENE G. BOTZ, *Primary Examiner.*